(12) United States Patent
Dainese, Jr. et al.

(10) Patent No.: US 12,449,591 B2
(45) Date of Patent: Oct. 21, 2025

(54) HOLLOW-CORE OPTICAL FIBERS

(71) Applicant: CORNING INCORPORATED, Corning, NY (US)

(72) Inventors: Paulo Clovis Dainese, Jr., Painted Post, NY (US); Wei Jiang, Vestal, NY (US); Ming-Jun Li, Horseheads, NY (US); Xiaojun Liang, Chino Hills, CA (US); Dan Trung Nguyen, Painted Post, NY (US); Ilia Andreyevich Nikulin, Wilmington, NC (US)

(73) Assignee: Corning Incorporated, Corning, NY (US)

( * ) Notice: Subject to any disclaimer, the term of this patent is extended or adjusted under 35 U.S.C. 154(b) by 280 days.

(21) Appl. No.: 18/225,409

(22) Filed: Jul. 24, 2023

(65) Prior Publication Data

US 2024/0036248 A1    Feb. 1, 2024

Related U.S. Application Data

(60) Provisional application No. 63/392,648, filed on Jul. 27, 2022.

(51) Int. Cl.
*G02B 6/02* (2006.01)
*G02B 6/032* (2006.01)

(52) U.S. Cl.
CPC ......... *G02B 6/02328* (2013.01); *G02B 6/032* (2013.01)

(58) Field of Classification Search
CPC . G02B 6/02304; G02B 6/02328; G02B 6/032
(Continued)

(56) References Cited

U.S. PATENT DOCUMENTS 10,393,956 B2    8/2019    Russell et al.
10,816,721 B1    10/2020   Chenard et al.
(Continued)

FOREIGN PATENT DOCUMENTS

CN    110333571 A  * 10/2019 ............... G02B 6/02
CN    111257992 A     6/2020
(Continued)

OTHER PUBLICATIONS

International Search Report and Written Opinion of the International Searching Authority; PCT/US2023/028117; dated Oct. 5, 2023; 17 pages; European Patent Office.
(Continued)

*Primary Examiner* — Robert Tavlykaev
(74) *Attorney, Agent, or Firm* — Kevin L. Bray

(57) ABSTRACT

A hollow-core optical fiber may include a hollow core extending along a central longitudinal axis of the fiber; a substrate; a plurality of first cladding elements spaced apart from each other and positioned between the hollow core and the substrate, each of the first cladding elements extending in a direction parallel to the central longitudinal axis of the fiber, each of the first cladding elements including a first capillary; and a plurality of second cladding elements spaced apart from each other and positioned between the hollow core and the substrate, each of the second cladding elements extending in a direction parallel to the central longitudinal axis of the fiber, each of the second cladding elements including a second capillary. Each of the first cladding elements directly contacts the inner surface of the substrate, and none of the second cladding elements directly contacts the inner surface of the substrate.

17 Claims, 8 Drawing Sheets

(58) Field of Classification Search
USPC .................................................. 385/125, 126
See application file for complete search history.

(56) References Cited

U.S. PATENT DOCUMENTS

| 10,859,763 | B2 | 12/2020 | Xu et al. | |
|---|---|---|---|---|
| 11,640,029 | B2* | 5/2023 | Jasion | G02B 6/02328 385/125 |
| 2005/0259944 | A1 | 11/2005 | Anderson et al. | |
| 2017/0160467 | A1* | 6/2017 | Poletti | H01S 3/06712 |
| 2020/0241200 | A1 | 7/2020 | Wang et al. | |
| 2020/0278491 | A1 | 9/2020 | Poletti et al. | |
| 2020/0319399 | A1 | 10/2020 | Mangan | |
| 2021/0088717 | A1 | 3/2021 | Jasion et al. | |
| 2022/0317368 | A1 | 10/2022 | Bauerschmidt et al. | |

FOREIGN PATENT DOCUMENTS

| CN | 111999800 | A | * | 11/2020 | ............ G02B 6/032 |
|---|---|---|---|---|---|
| CN | 112230329 | A | * | 1/2021 | ............ G02B 6/02 |
| CN | 113900172 | A | * | 1/2022 | ............ G02B 6/02 |
| CN | 114114526 | A | * | 3/2022 | ............ G02B 6/032 |
| CN | 114721086 | A | * | 7/2022 | ............ G02B 6/02 |
| EP | 3754389 | A1 | | 12/2020 | |
| GB | 2565117 | A | | 2/2019 | |
| IN | 202247001691 | A | | 2/2022 | |

OTHER PUBLICATIONS

Amrani, et al., "Low-loss single-mode hybrid-lattice hollow-core photonic-crystal fibre", Light: Science & Applications, vol. 10, No. 1, 2021, pp. 1-12.
F. Poletti, "Nested antiresonant nodeless hollow core fiber", Opt. Express, vol. 22, 2014, pp. 23807-23828.
G. T. Jasion et al. " Hollow Core NANF with 0.28 dB/km Attenuation in the C and L Bands", paper Th4B.4, OFC 2020.
Hayashi, et al., "Numerical modeling of a hybrid hollow-core fiber for enhanced mid-infrared guidance", Optics Express, vol. 29, No. 11, 2021, pp. 17042-17052.
P. Yeh, et al., "Theory of Bragg fiber", Opt. Soc. Am., vol. 68, 1978, pp. 1196-1201.
S. G. Johnson et al., "Low-loss asymptotically single-mode propagation in large-core OmniGuide fibers", Opt. Express, vol. 9, pp. 748-779 (2001).
Shaha, et al., "Low loss double cladding nested hollow core antiresonant fiber", OSA Continuum, vol. 3, No. 9, 2020, pp. 2512-2524.
Shemuly, et al., "Asymmetric wave propagation in planar chiral fibers", Optics express, vol. 21, No. 2, 2013, pp. 1465-1472.
Yang, et al., "Low Loss Hollow-Core Connecting-Circle Negative-Curvature Fibres", IEEE Photonics Journal, vol. 13, No. 1, 2021, pp. 1-10.
Zhu, et al., "Low loss hollow-core antiresonant fiber with nested supporting rings", Optics Express, vol. 29, No. 2, 2021, pp. 1659-1665.

* cited by examiner

HOLLOW-CORE OPTICAL FIBERS

This application claims the benefit of priority under 35 U.S.C § 120 of U.S. Provisional Application Ser. No. 63/392,648 filed on Jul. 27, 2022, the content of which is relied upon and incorporated herein by reference in its entirety.

BACKGROUND

Field

The present specification generally relates to optical fibers and, more specifically, to hollow-core optical fibers.

Technical Background

Hollow-core optical fibers transmit light through a hollow core. Loss of light from the hollow core along the length of the optical fiber may be an impediment to implementing hollow-core optical fibers in practical applications. Accordingly, a need exists for hollow-core optical fibers having structures that confine light to the hollow core, thereby reducing light loss from the hollow core along the length of the optical fiber.

SUMMARY

According to a first aspect of the present disclosure, a hollow core extending along a central longitudinal axis of the hollow-core optical fiber; a substrate, the substrate comprising a tubular shape and an inner surface surrounding the central longitudinal axis of the hollow-core optical fiber; a plurality of first cladding elements spaced apart from each other and positioned between the hollow core and the substrate, each of the plurality of first cladding elements extending in a direction parallel to the central longitudinal axis of the hollow-core optical fiber, each of the plurality of first cladding elements comprising a first capillary, the first capillary comprising an inner surface defining a first cavity, the first cavity having a first diameter and being occupied solely by a gas; and a plurality of second cladding elements spaced apart from each other and positioned between the hollow core and the substrate, each of the second cladding elements extending in a direction parallel to the central longitudinal axis of the hollow-core optical fiber, each of the second cladding elements comprising a second capillary, the second capillary comprising an inner surface defining a second cavity, the second cavity having a second diameter and being occupied solely by the gas, the second diameter differing from the first diameter. Each of the plurality of first cladding elements directly contacts the inner surface of the substrate, and none of the second cladding elements directly contacts the inner surface of the substrate.

A second aspect of the present disclosure may include the first aspect, wherein each first cladding element is spaced apart from adjacent first cladding elements in a circumferential direction.

A third aspect of the present disclosure may include the second aspect, wherein the first cladding elements are equally spaced apart in the circumferential direction.

A fourth aspect of the present disclosure may include any of the first through third aspects, wherein each second capillary directly contacts at least one first capillary.

A fifth aspect of the present disclosure may include any of the first through fourth aspects, wherein each second cladding element is spaced apart from the inner surface of the substrate in a radial direction.

A sixth aspect of the present disclosure may include any of the first through fifth aspects, wherein each second cladding element is spaced apart from adjacent second cladding elements in a circumferential direction.

A seventh aspect of the present disclosure may include any of the first through sixth aspects, wherein the second cladding elements are equally spaced apart in the circumferential direction.

An eighth aspect of the present disclosure may include any of the first through seventh aspects, wherein the plurality of first cladding elements is symmetrically disposed about the central longitudinal axis of the hollow-core optical fiber.

A ninth aspect of the present disclosure may include any of the first through eighth aspects, wherein the plurality of second cladding elements is symmetrically disposed about the central longitudinal axis of the hollow-core optical fiber.

A tenth aspect of the present disclosure may include any of the first through ninth aspects, wherein each first capillary is directly connected to two second capillaries.

An eleventh aspect of the present disclosure may include any of the first through tenth aspects, wherein the plurality of first cladding elements comprises from 3 to 8 first capillaries.

A twelfth aspect of the present disclosure may include any of the first through eleventh aspects, wherein the plurality of first cladding elements comprises from 5 to 6 first capillaries.

A thirteenth aspect of the present disclosure may include any of the first through twelfth aspects, wherein the plurality of second cladding elements comprises from 3 to 12 second capillaries.

A fourteenth aspect of the present disclosure may include any of the first through thirteenth aspects, wherein the plurality of second cladding elements comprises from 5 to 6 second capillaries.

A fifteenth aspect of the present disclosure may include any of the first through fourteenth aspects, wherein a number of first cladding elements is equal to a number of second cladding elements.

A sixteenth aspect of the present disclosure may include any of the first through fifteenth aspects, wherein a number of first capillaries is equal to a number of second capillaries.

A seventeenth aspect of the present disclosure may include any of the first through sixteenth aspects, wherein the second diameter is greater than the first diameter.

An eighteenth aspect of the present disclosure may include any of the first through seventeenth aspects, wherein each first capillary comprises a first capillary central longitudinal axis parallel to the central longitudinal axis of the fiber.

A nineteenth aspect of the present disclosure may include any of the first through eighteenth aspects, wherein each second capillary comprises a second capillary central longitudinal axis parallel to the central longitudinal axis of the fiber.

A twentieth aspect of the present disclosure may include any of the first through nineteenth aspects, wherein each first capillary comprises a first capillary central longitudinal axis parallel to the central longitudinal axis of the hollow-core optical fiber and the first capillary central longitudinal axis is a first radial distance from the central longitudinal axis; each second capillary comprises a second capillary central longitudinal axis parallel to the central longitudinal axis of the hollow-core optical fiber and the second capillary central longitudinal axis is a second radial distance from the central longitudinal axis; and the first radial distance is greater than the second radial distance.

A twenty-first aspect of the present disclosure may include any of the first through twentieth aspects, wherein each of the first capillaries comprises silica-based glass.

A twenty-second aspect of the present disclosure may include any of the first through twenty-first aspects, wherein each of the second capillaries comprises silica-based glass.

A twenty-third aspect of the present disclosure may include any of the first through twenty-second aspects, wherein the substrate comprises silica-based glass.

A twenty-fourth aspect of the present disclosure may include any of the first through twenty-third aspects, wherein the hollow core comprises one or more gasses.

A twenty-fifth aspect of the present disclosure may include any of the first through twenty-fourth aspects, wherein the hollow core consists essentially of air.

A twenty-sixth aspect of the present disclosure may include any of the first through twenty-fifth aspects, wherein each first capillary has an inner diameter from 12 µm to 54 µm.

A twenty-seventh aspect of the present disclosure may include any of the first through twenty-sixth aspects, wherein each first capillary has a wall thickness from 0.1 µm to 4.0 µm.

A twenty-eighth aspect of the present disclosure may include any of the first through twenty-seventh aspects, wherein each second capillary has an inner diameter from 16 µm to 65 µm.

A twenty-ninth aspect of the present disclosure may include any of the first through twenty-eighth aspects, wherein each second capillary has a wall thickness from 0.1 µm to 4.0 µm.

A thirtieth aspect of the present disclosure may include any of the first through twenty-ninth aspects, wherein the plurality of first cladding elements and the plurality of second cladding elements are configured to provide an anti-resonant effect operable to confine an optical signal having a wavelength from 350 nm to 8000 nm in the hollow core.

A thirty-first aspect of the present disclosure may include any of the first through thirtieth aspects, wherein the hollow-core optical fiber has a confinement loss that varies with wavelength and the hollow-core optical fiber has a minimum confinement loss of a fundamental mode of an optical signal propagating in the hollow-core optical fiber less than or equal to 0.50 dB/km within a wavelength range from 350 nm to 8000 nm.

A thirty-second aspect of the present disclosure may include any of the first through thirty-first aspects, wherein the hollow-core optical fiber further comprises a plurality of third cladding elements spaced apart from each other and positioned between the plurality of second cladding elements and the hollow core, each of the plurality of third cladding elements extending in a direction parallel to the central longitudinal axis of the hollow-core optical fiber, wherein each of the plurality of third cladding elements comprises a third capillary, the third capillary comprising an inner surface defining a third cavity having a third diameter and being occupied solely by the gas.

A thirty-third aspect of the present disclosure may include the thirty-second aspect, wherein each third capillary comprises a third capillary central longitudinal axis parallel to the central longitudinal axis of the fiber.

A thirty-fourth aspect of the present disclosure may include either the thirty-second aspect or the thirty-third aspect, wherein each third capillary directly contacts at least one second capillary.

A thirty-fifth aspect of the present disclosure may include any of the thirty-second through thirty-fourth aspects, wherein each second capillary directly contacts two third capillaries.

A thirty-sixth aspect of the present disclosure may include any of the thirty-second through thirty-fifth aspects, wherein each third cladding element is spaced apart from adjacent third cladding elements in a circumferential direction.

A thirty-seventh aspect of the present disclosure may include the thirty-sixth aspect, wherein the third cladding elements are equally spaced apart in the circumferential direction.

A thirty-eighth aspect of the present disclosure may include any of the thirty-second through thirty-seventh aspects, wherein the plurality of third cladding elements comprises from 3 to 8 third capillaries.

A thirty-ninth aspect of the present disclosure may include any of the thirty-second through thirty-eighth aspects, wherein the plurality of third cladding elements comprises from 5 to 6 third capillaries.

A fortieth aspect of the present disclosure may include any of the thirty-second through thirty-ninth aspects, wherein a number of first cladding elements is equal to a number of second cladding elements and a number of third cladding elements.

A forty-first aspect of the present disclosure may include any of the thirty-second through fortieth aspects, wherein the third diameter is from 15 µm to 66 µm.

A forty-second aspect of the present disclosure may include any of the thirty-second through forty-first aspects, wherein each third capillary has a wall thickness from 0.1 µm to 4.0 µm.

A forty-third aspect of the present disclosure may include any of the thirty-second through forty-second aspects, wherein the third diameter differs from the first diameter and the second diameter.

According to a forty-fourth aspect of the present disclosure, a hollow-core optical fiber may comprise a hollow core extending along a central longitudinal axis of the hollow-core optical fiber; a substrate, the substrate comprising a tubular shape and an inner surface surrounding the central longitudinal axis of the hollow-core optical fiber; a plurality of first cladding elements spaced apart from each other and positioned between the hollow core and the substrate, each of the plurality of first cladding elements extending in a direction parallel to the central longitudinal axis of the hollow-core optical fiber, each of the plurality of first cladding elements comprising a first capillary, the first capillary comprising an inner surface defining a first cavity, the first cavity having a first diameter, wherein each of the plurality of first cladding elements directly contacts the inner surface of the substrate; and a plurality of second cladding elements spaced apart from each other and positioned between the hollow core and the substrate, each of the second cladding elements extending in a direction parallel to the central longitudinal axis of the hollow-core optical fiber, each of the second cladding elements comprising a second capillary, the second capillary comprising an inner surface defining a second cavity, the second cavity having a second diameter, the second diameter differing from the first diameter, wherein none of the second cladding elements directly contacts the inner surface of the substrate. Each first capillary comprises a nested capillary, wherein each nested capillary directly contacts the inner surface of the first capillary; or each second capillary comprises a nested capillary, wherein each nested capillary directly contacts the inner surface of the second capillary.

A forty-fifth aspect of the present disclosure may include the forty-fourth aspect, wherein each nested capillary has an inner diameter from 6 µm to 25 µm.

A forty-sixth aspect of the present disclosure may include any of the forty-fourth through forty-fifth aspects, wherein each nested capillary has a wall thickness from 0.1 µm to 4.0 µm.

A forty-seventh aspect of the present disclosure may include any of the forty-fourth through forty-sixth aspects, wherein each nested capillary directly contacts the inner surface of the second capillary at a point proximate to the substrate.

A forty-eighth aspect of the present disclosure may include any of the forty-fourth through forty-seventh aspects, wherein the hollow-core optical fiber has a confinement loss that varies with wavelength and the hollow-core optical fiber has a minimum confinement loss of a fundamental mode of an optical signal propagating in the hollow-core optical fiber less than or equal to 0.2 dB/km within a wavelength range from 350 nm to 8000 nm.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
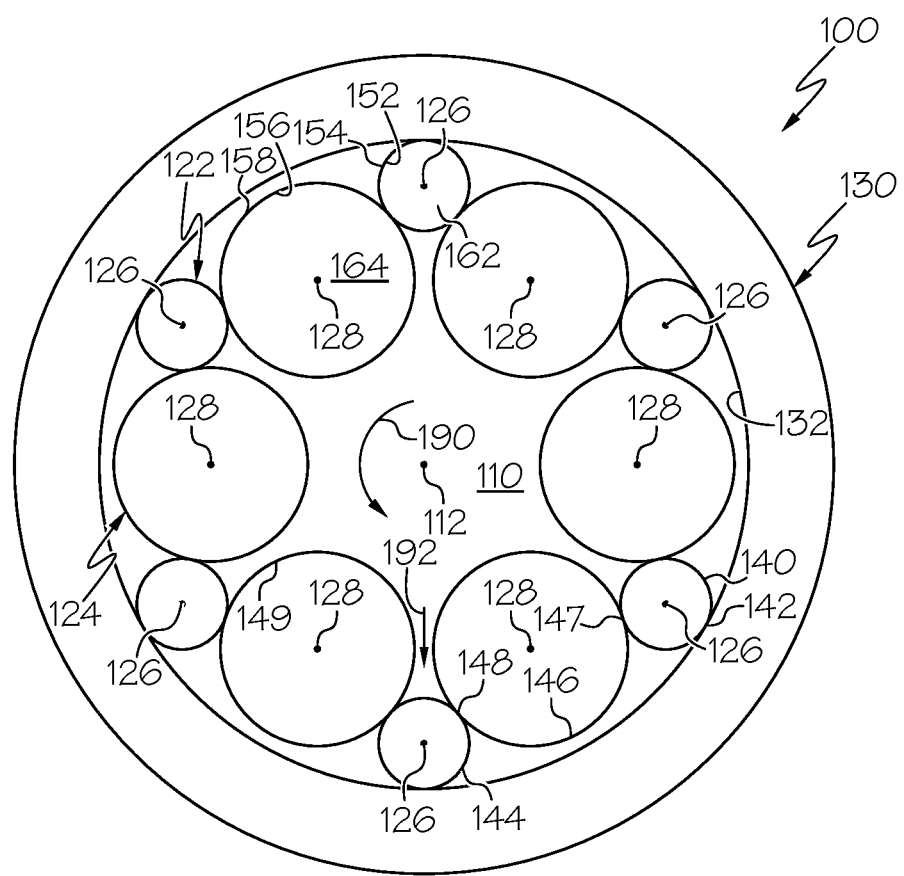
FIG. 1 schematically depicts a cross-sectional view of a hollow-core optical fiber according to one or more embodiments described herein.

Reference will now be made in detail to various embodiments of hollow-core optical fibers. Whenever possible, the same reference numerals will be used throughout the drawings to refer to the same or like parts. In embodiments, hollow-core optical fibers may comprise a hollow core, a substrate, and cladding elements positioned between the hollow core and the substrate. The hollow-core optical fiber may comprise a plurality of first cladding elements and a plurality of second cladding elements, where the first cladding elements directly contact an inner surface of the substrate and none of the second plurality of cladding elements directly contact the inner surface of the substrate. Embodiments of hollow-core optical fibers will be described in further detail herein.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Various components described herein may be referred to as "directly connected" or "indirectly connected". Components are directly connected when they are joined to one another with no intervening structure. Components may be joined by fusing, welding, adhesives, or any other suitable attachment means. Components are "indirectly connected" when they are joined to one another with intervening structure. Examples of intervening structure include welding aids (e.g. frits, solders, fluxes), adhesives, and bonding materials. In embodiments, components connected indirectly are connected only by a welding aid, adhesive, or bonding material. The term "connected" means "directly connected" or "indirectly connected". Components "directly connected" to one another are said to be in direct contact with each other. Components "indirectly connected" to one another are said to be in indirect contact with each other. Components "connected" to one another are in direct or indirect contact with each other.

As used herein, the singular forms "a," "an" and "the" include plural referents unless the context clearly dictates otherwise. Thus, for example, reference to "a" component includes aspects having two or more such components, unless the context clearly indicates otherwise.

Without intending to be bound by theory, an optical signal (i.e., light) may be passed through the hollow core of a hollow-core optical fiber. As used herein, "attenuation" refers to the reduction of intensity of the optical signal passing through the hollow-core optical fiber. Attenuation of the optical signal being guided through the hollow-core optical fiber may be reduced by various effects, including but not limited to, an anti-resonant effect and an inhibited coupling mechanism. Each of these effects may reduce the leakage of light from the hollow core of the optical fiber to the cladding elements of the optical fiber, which in turn reduces the attenuation of the optical signal propagating in the hollow core. Said differently, each of these effects may improve the confinement of light to the hollow core of the optical fiber, thereby reducing the attenuation of the optical signal propagating in the hollow core. Embodiments of hollow-core optical fibers described herein may comprise structures that utilize one or more of these effects to reduce the attenuation of an optical signal passing through the hollow-core optical fiber.

As used herein, "anti-resonance" or an "anti-resonant effect" refers to an effect that occurs when the thickness of a material (e.g. the material used to form cladding elements) is proportional to a wavelength of light passing through the hollow-core optical fiber such that the light passing through the hollow-core optical fiber is confined to the hollow core. Without intending to be bound by theory, an anti-resonant effect occurs when the thickness of a material satisfies the quarter-wave condition (phase accumulated on a single pass is one quarter of $2\pi$, and any odd multiple of a quarter wave). When this condition is applied to the thickness of the material, light is confined to the hollow core with minimum leakage to the cladding. In other words, this condition helps inhibit coupling between core modes and cladding modes, resulting in low loss of transmission and increased confinement of the optical signal in the hollow core. The anti-resonant effect may, in one embodiment, be satisfied by a material having a thickness given by Equation 1:

$$t_{AR} = \frac{(2m-1)\lambda}{(4\{n^2-1\}^{1/2})} \quad \text{Equation 1}$$

In Equation 1, $t_{AR}$ is the thickness of the material that satisfies the anti-resonance condition, $\lambda$ is the wavelength of the optical signal, m is an integer that is greater than or equal to 1, and n is the refractive index of the material. It should be noted that Equation 1 represents an ideal thickness of a material that would satisfy the anti-resonant effect, and that material thicknesses that are not exactly equal to $t_{AR}$ may also provide increased confinement of light to the hollow core. For example, without limitation, it is contemplated that a material having a thickness within 10% of $t_{AR}$ (from 90% $t_{AR}$ to 110% $t_{AR}$) may be operable to confine light to the hollow core.

As used herein, an "inhibited coupling mechanism" refers to an effect that occurs when cladding elements having negative curvature inhibit coupling between core modes and cladding modes to reduce light leakage from the hollow core. As used herein, "negative curvature" refers to cladding elements having a surface with a convex shape facing the central longitudinal axis of the hollow core optical fiber. Without intending to be bound by theory, using cladding elements having a surface with a convex shape facing the central longitudinal axis of the hollow-core optical fiber may reduce the amount of light that contacts the cladding elements and may also reduce the light leaking through the cladding elements and the gaps between these cladding elements. In turn, this may reduce attenuation of the optical signal due to the leaking through the cladding elements and the gaps between them and may also reduce light scattering that may occur when light contacts the surface of the cladding elements.

Referring now to FIG. 1, a hollow-core optical fiber 100 may comprise a hollow core 110 extending along a central longitudinal axis 112 of the fiber and a substrate 130. Generally, the hollow core 110 is the light-guiding portion of the hollow-core optical fiber 100. Hollow core 110 has a radius that extends in an orthogonal direction from central longitudinal axis 112 to the closest point of contact with one of the cladding elements 120. The diameter of hollow core 110 is twice the radius of hollow core 110. The diameter of hollow core 110 is greater than or equal to 15 microns, or greater than or equal to 20 microns, or greater than or equal to 25 microns, or less than or equal to 45 microns, or less than or equal to 40 microns, or less than or equal to 35 microns, or in a range from 15 microns to 45 microns, or in a range from 20 microns to 40 microns, or in a range from 25 microns to 35 microns.

The substrate 130 may be operable to support any cladding elements included in the hollow-core optical fiber 100. In embodiments, the substrate 130 may comprise a tubular shape comprising an inner surface 132 surrounding the central longitudinal axis 112 of the fiber. In embodiments, the outer diameter of the substrate 130 may be from 100 µm to 500 µm. For example, without limitation, the outer diameter of the substrate 130 may be from 100 µm to 500 µm, from 200 µm to 500 µm, from 300 µm to 500 µm, from 400 µm to 500 µm, from 100 µm to 400 µm, from 100 µm to 300 µm, from 100 µm to 200 µm, or any combination or subset of these ranges. In embodiments, the outer diameter of the substrate may be from 100 µm to 250 µm.

In embodiments, the substrate 130 has a wall thickness from 1 µm to 100 µm. For example, without limitation, the wall thickness of the substrate 130 may be from 2 µm to 80 µm, from 5 µm to 60 µm, from 10 µm to 50 µm, from 15 µm to 40 µm, from 15 µm to 30 µm, from 20 µm to 30 µm, or any combination or subset of these ranges. In embodiments, the outer diameter of the substrate may be from 100 µm to 250 µm.

In embodiments, one or more protective coatings (not depicted) may be positioned on an exterior surface of the substrate 130. These coatings may be, for example, organic materials, such as plastics or polymers, and may protect the hollow-core optical fiber 100 from the physical environment. The coatings may include a primary coating with a low Young's modulus (e.g. <1 MPa) surrounding and adjacent to the substrate 130 and a secondary coating with a high Young's modulus (e.g. >1000 MPa) surrounding and adjacent to the primary coating. Representative materials for primary and secondary coatings include acrylate materials (e.g. urethane acrylates). In embodiments, a coated fiber may have an outer diameter of 242 microns, 200 microns, or 190 microns. In embodiments the thickness of the primary coating in a radial direction is greater than 10 microns, or greater than 15 microns, or greater than 20 microns, or less than 45 microns, or less than 40 microns, or less than 35 microns, or in a range from 10 microns to 45 microns, or in a range from 15 microns to 40 microns, or in a range from 20 microns to 35 microns. In embodiments the thickness of the secondary coating in a radial direction is greater than 10 microns, or greater than 15 microns, or greater than 20 microns, or less than 45 microns, or less than 40 microns, or less than 35 microns, or in a range from 10 microns to 45 microns, or in a range from 15 microns to 40 microns, or in a range from 20 microns to 35 microns.

The hollow-core optical fiber 100 comprises a plurality of first cladding elements 122 and a plurality of second cladding elements 124. Each of the plurality of first cladding elements 122 may extend in a direction parallel to the central longitudinal axis 112 of the fiber. Each of the plurality of first cladding elements 122 may comprise a first capillary comprising an inner surface 152 defining a first cavity 162. In embodiments, the first cavity 162 may have a first diameter and be occupied solely by a gas. Likewise, each of the plurality of second cladding elements 124 may extend in a direction parallel to the central longitudinal axis 112 of the fiber. Each of the plurality of second cladding elements 124 may comprise a second capillary, and each second capillary may comprise an inner surface 156 defining a second cavity 164. In embodiments, the second cavity 164 may have a second diameter and be occupied solely by a gas. In embodiments, the second diameter and first diameter are different. For example, the second diameter may be greater than or less than the first diameter. In the embodiment depicted in FIG. 1, the second diameter is greater than the first diameter.

In embodiments, each of the plurality of first cladding elements 122 may directly contact the inner surface 132 of the substrate 130 and none of the plurality of second cladding elements 124 may directly contact the inner surface 132 of the substrate 130. In other words, the plurality of first cladding elements 122 may be positioned between the substrate 130 and the hollow core 110, and the plurality of second cladding elements 124 may be positioned between the plurality of first cladding elements 122 and the hollow core 110 such that the plurality of second cladding elements 124 are spaced apart from the substrate 130.

In embodiments, the plurality of first cladding elements 122 may comprise from 3 to 8 first capillaries. For example, without limitation, the plurality of first cladding elements 122 may comprise 3, 4, 5, 6, 7, or 8 first capillaries. In embodiments, the plurality of first cladding elements 122 may comprise from 5 to 6 first capillaries. In embodiments, the plurality of second cladding elements 124 may comprise from 3 to 12 second capillaries. For example, without limitation, the plurality of second cladding elements 124 may comprise, 3, 4, 5, 6, 7, 8, 9, 10, 11, or 12 second capillaries. In embodiments, the plurality of second cladding elements 124 may comprise from 5 to 6 second capillaries. In embodiments, the number of first cladding elements may be equal to the number of second cladding elements such that the number of first capillaries is equal to the number of second capillaries. In embodiments, the number of first cladding elements may be greater than or less than the number of second cladding elements such that the number of first capillaries is greater than or less than the number of second capillaries.

As described herein, the capillaries may have an enclosed cross section comprising a wall having an inner surface and an exterior surface. Accordingly, it should be understood that the capillaries generally may have a tubular shape. In embodiments, the capillaries may have a circular, elliptical, oval, or any other suitable cross sectional shape. Without intending to be bound by theory, when the capillary has a circular, elliptical, oval, or similar cross sectional shape, a convex surface of the capillary may be facing the hollow core of the hollow-core optical fiber. Without intending to be bound by theory, a convex surface provides a negative curvature effect that facilitates an inhibited coupling mechanism to reduce attenuation of an optical signal passing through the hollow-core optical fiber.

In embodiments, each first capillary in the plurality of first cladding elements 122 may be directly connected to the inner surface 132 of the substrate 130. For example, first capillary 140 is directly connected to the inner surface 132 of the substrate 130 at point 142 in the embodiment depicted in FIG. 1. In embodiments, the plurality of first cladding elements 122 is symmetrically disposed about the central longitudinal axis 112 of the hollow-core optical fiber 100. Each first capillary in the plurality of first cladding elements 122 may comprise a first capillary central longitudinal axis 126. In embodiments, each first capillary central longitudinal axis 126 may be parallel to the central longitudinal axis 112 of the hollow-core optical fiber 100. Each first capillary central longitudinal axis 126 may be parallel to each other first capillary central longitudinal axis 126. In embodiments, each first capillary central longitudinal axis 126 may be positioned on a circumference of a circle that is perpendicular to central longitudinal axis 112 of the hollow-core optical fiber 100. For example, in embodiments, each first capillary central longitudinal axis 126 may be positioned on the circumference of a circle that is perpendicular to and centered on the central longitudinal axis 112 of the hollow-core optical fiber 100. In such embodiments, it should be understood that each first capillary central longitudinal axis 126 is equidistant from the central longitudinal axis 112 of the fiber.

In embodiments, each first cladding element is spaced apart from adjacent first cladding elements in a circumferential direction 190. In other words, each first capillary in the plurality of first cladding elements 122 is spaced apart from adjacent first capillaries in the plurality of first cladding elements 122 in a circumferential direction 190. Each first capillary in the plurality of first cladding elements 122 may not be in direct contact with another first capillary in the plurality of first cladding elements 122. For example, according to the embodiment depicted in FIG. 1, first capillary 140 and first capillary 144 are both in the plurality of first cladding elements 122, and first capillary 140 and first capillary 144 are spaced apart in a circumferential direction 190 such that first capillary 140 and first capillary 144 are not in direct contact with each other. Each of first capillary 140 and first capillary 144 is in direct contact with substrate 130. In embodiments, the first cladding elements 122 are equally spaced apart in the circumferential direction 190. Without intending to be bound by theory, when first capillaries in the plurality of first cladding elements 122 are in direct contact, the points at which the first capillaries are in contact may support localized modes, which may permit coupling between core modes and cladding modes that may increase light leakage from the hollow core 110. Accordingly, direct contact between the first capillaries may reduce the confinement of light in the hollow core 110 of the hollow-core optical fiber 100 at those points. In turn, this may result in increased attenuation of an optical signal passing through the hollow-core optical fiber 100.

In embodiments, each first capillary in the plurality of first cladding elements 122 may have an inner diameter from 12 µm to 54 µm. For example, without limitation, each first capillary in the plurality of first cladding elements 122 may have an inner diameter from 12 µm to 54 µm, from 16 µm to 54 µm, from 20 µm to 54 µm, 24 µm to 54 µm, 28 µm to 54 µm, 32 µm to 54 µm, 36 µm to 54 µm, 40 µm to 54 µm, 44 µm to 54 µm, 48 µm to 54 µm, 52 µm to 54 µm, 12 µm to 50 µm, 12 µm to 46 µm, 12 µm to 42 µm, 12 µm to 38 µm, 12 µm to 34 µm, 12 µm to 30 µm, 12 µm to 26 µm, 12 µm to 22 µm, 12 µm to 18 µm, 12 µm to 16 µm, or any combination or sub-set of these ranges. In embodiments, each first capillary in the plurality of first cladding elements 122 may have the same inner diameter.

In embodiments, each first capillary in the plurality of first cladding elements 122 may have a wall thickness from 0.1 µm to 4.0 µm. As described herein, wall thickness refers to the distance between the exterior surface 154 of each first capillary in the plurality of first cladding elements 122 and the inner surface 152 of each first capillary in the plurality of first cladding elements 122. For example, without limitation, each first capillary in the plurality of first cladding elements 122 may have a wall thickness from 0.1 µm to 4.0 µm, from 0.5 µm to 4.0 µm, from 1 µm to 4.0 µm, from 1.5 µm to 4.0 µm, from 2.0 µm to 4.0 µm, from 2.5 µm to 4.0 µm, from 3.0 µm to 4.0 µm, from 3.5 µm to 4.0 µm, 0.1 µm to 3.5 µm, 0.1 µm to 3.0 µm, 0.1 µm to 2.5 µm, 0.1 µm to 2.0 µm, 0.1 µm to 1.5 µm, 0.1 µm to 1.0 µm, 0.1 µm to 0.5 µm, or any combination or sub-set of these ranges. In embodiments, each first capillary in the plurality of first cladding elements 122 may have the same wall thickness. In embodiments, each first capillary may have a wall thickness, such as a wall thickness according to Equation 1, that promotes confinement of the optical signal to the hollow core 110 through an anti-resonant effect. Without intending to be bound by theory, when each first capillary has a wall thickness that provides the anti-resonant effect, attenuation of an optical signal passing through the optical fiber may be reduced.

Each second capillary in the plurality of second cladding elements 124 may be directly connected to at least one first capillary in the plurality of first cladding elements 122. In embodiments, each capillary in the plurality of second cladding elements 124 may be directly connected to two or a plurality of first capillaries in the plurality of first cladding elements 122. For example, second capillary 146 in the plurality of second cladding elements 124 may be directly connected to first capillary 140 in the plurality of first cladding elements 122 at point 147 and second capillary 146 may be directly connected to first capillary 144 in the plurality of first cladding elements 122 at point 148 in the embodiment depicted in FIG. 1. Without intending to be bound by theory, direct connection between capillaries in the plurality of second cladding elements 124 with two capillaries in the plurality of first cladding elements 122 may increase the structural integrity of the plurality of second cladding elements 124. This may lead to fewer defects in the plurality of second cladding elements 124 during manufacturing of the hollow-core optical fiber 100.

The first capillaries in the plurality of first cladding elements 122 may be positioned in gaps between second capillaries in the plurality of second cladding elements 124. For example, without limitation, first capillary 144 in the plurality of first cladding elements 122 is positioned in a gap between second capillary 146 and second capillary 149 in the plurality of second cladding elements 124 in the embodiment depicted in FIG. 1. Without being bound by theory, positioning the first capillaries of the plurality of first cladding elements 122 in gaps between the second capillaries of the plurality of second cladding elements 124 allows the plurality of first cladding elements 122 to support the plurality of second cladding elements 124. Furthermore, positioning the first capillaries in the gaps between the second capillaries allows for further confinement of light in the hollow core 110 that may otherwise pass through the gaps between the second capillaries. This may result in decreased attenuation of light passing through the hollow-core optical fiber 100.

In embodiments, each second capillary in the plurality of second cladding elements 124 comprises a second capillary central longitudinal axis 128. Each second capillary central longitudinal axis 128 may be parallel to the central longitudinal axis 112 of the hollow-core optical fiber 100. In embodiments, each second capillary central longitudinal axis 128 may be parallel to each other second capillary central longitudinal axis 128. In embodiments, each second capillary central longitudinal axis 128 may be parallel to each of the first capillary central longitudinal axes 126. In embodiments, the central longitudinal axis 112 of the hollow-core optical fiber 100 may be parallel to both the first capillary central longitudinal axes 126 and the second capillary central longitudinal axes 128. In embodiments, each second capillary central longitudinal axis 128 may be positioned on a circumference of a circle that is perpendicular to central longitudinal axis 112 of the hollow-core optical fiber 100. For example, in embodiments, each second capillary central longitudinal axis 128 may be positioned on the circumference of a circle that is perpendicular to and centered on the central longitudinal axis 112 of the fiber. In such embodiments, it should be understood that each second capillary central longitudinal axis 128 is equidistant from the central longitudinal axis 112 of the fiber. In embodiments, the plurality of second cladding elements 122 is symmetrically disposed about the central longitudinal axis 112 of the hollow-core optical fiber 100.

In embodiments, each first capillary central longitudinal axis 126 is a first radial distance from the central longitudinal axis 112 of the hollow-core optical fiber 100. Likewise, each second capillary central longitudinal axis 128 is a second radial distance from the central longitudinal axis 112 of the hollow-core optical fiber 100. In embodiments, the first radial distance may be greater than the second radial distance.

Each second capillary in the plurality of second cladding elements 124 may be spaced apart from the inner surface 132 of the substrate 130 in a radial direction 192. That is, each capillary in the plurality of second cladding elements 124 may not be in direct contact with the inner surface 132 of the substrate 130. For example, according to the embodiment depicted in FIG. 1, second capillary 146 in of the plurality of second cladding elements 124 is spaced apart from the inner surface 132 of the substrate 130 in a radial direction 192 such that second capillary 146 is not in direct contact with the inner surface 132 of the substrate 130.

In embodiments, each second capillary in the plurality of second cladding elements 124 is spaced apart from adjacent second capillaries in the plurality of second cladding elements 124 in a circumferential direction 190. Each second capillary in the plurality of second cladding elements 124 may not be in direct contact with another second capillary in the plurality of second cladding elements 124. For example, according to the embodiment depicted in FIG. 1, second capillary 146 and second capillary 149 are both in the plurality of second cladding elements 124, and second capillary 146 and second capillary 149 are spaced apart in a circumferential direction 190 such that second capillary 146 and second capillary 149 are not in direct contact with each other. In embodiments, the second cladding elements 124 are equally spaced apart in the circumferential direction 190. Without intending to be bound by theory, when second capillaries in the plurality of second cladding elements 124 are in direct contact, the points at which the second capillaries are in contact may support localized modes, which may permit coupling between core modes and cladding modes that may increase light leakage from the hollow core 110. Accordingly, direct contact between the capillaries may reduce the confinement of light in the hollow core 110 of the hollow-core optical fiber 100 at those points. In turn, this may result in increased attenuation of an optical signal passing through the hollow-core optical fiber 100.

In embodiments, each second capillary in the plurality of second cladding elements 124 has an inner diameter from 16 µm to 65 µm. For example, without limitation, each second capillary in the plurality of second cladding elements 124 has an inner diameter from 16 µm to 65 µm, from 20 µm to 65 µm, from 25 µm to 65 µm, from 30 µm to 65 µm, from 35 µm to 65 µm, from 40 µm to 65 µm, from 45 µm to 65 µm, from 50 µm to 65 µm, from 55 µm to 65 µm, from 60 µm to 65 µm, from 16 µm to 60 µm, from 16 µm to 55 µm, from 16 µm to 50 µm, from 16 µm to 45 µm, from 16 µm to 40 µm, from 16 µm to 35 µm, from 16 µm to 30 µm, from 16 µm to 25 µm, from 16 µm to 20 µm, or any combination or subset of these ranges.

In embodiments, each second capillary in the plurality of second cladding elements 124 has a wall thickness from 0.1 µm to 4.0 µm. As described herein, wall thickness refers to the distance between the exterior surface 158 of each second capillary in the plurality of second cladding elements 124 and the inner surface 156 of each second capillary in the plurality of second cladding elements 124. For example, without limitation, each second capillary in the plurality of second cladding elements 124 may have a wall thickness from 0.1 µm to 4.0 µm, from 0.5 µm to 4.0 µm, from 1 µm to 4.0 µm, from 1.5 µm to 4.0 µm, from 2.0 µm to 4.0 µm, from 2.5 µm to 4.0 µm, from 3.0 µm to 4.0 µm, from 3.5 µm to 4.0 µm, 0.1 µm to 3.5 µm, 0.1 µm to 3.0 µm, 0.1 µm to 2.5 µm, 0.1 µm to 2.0 µm, 0.1 µm to 1.5 µm, 0.1 µm to 1.0 µm, 0.1 µm to 0.5 µm, or any combination or sub-set of these ranges. In embodiments, each second capillary may have a wall thickness, such as a wall thickness according to Equation 1, that promotes confinement of the optical signal in the hollow core 110 through an anti-resonant effect. Without intending to be bound by theory, when each second capillary has a wall thickness that provides the anti-resonant effect, attenuation of an optical signal passing through the optical fiber may be reduced.

Figure 2:
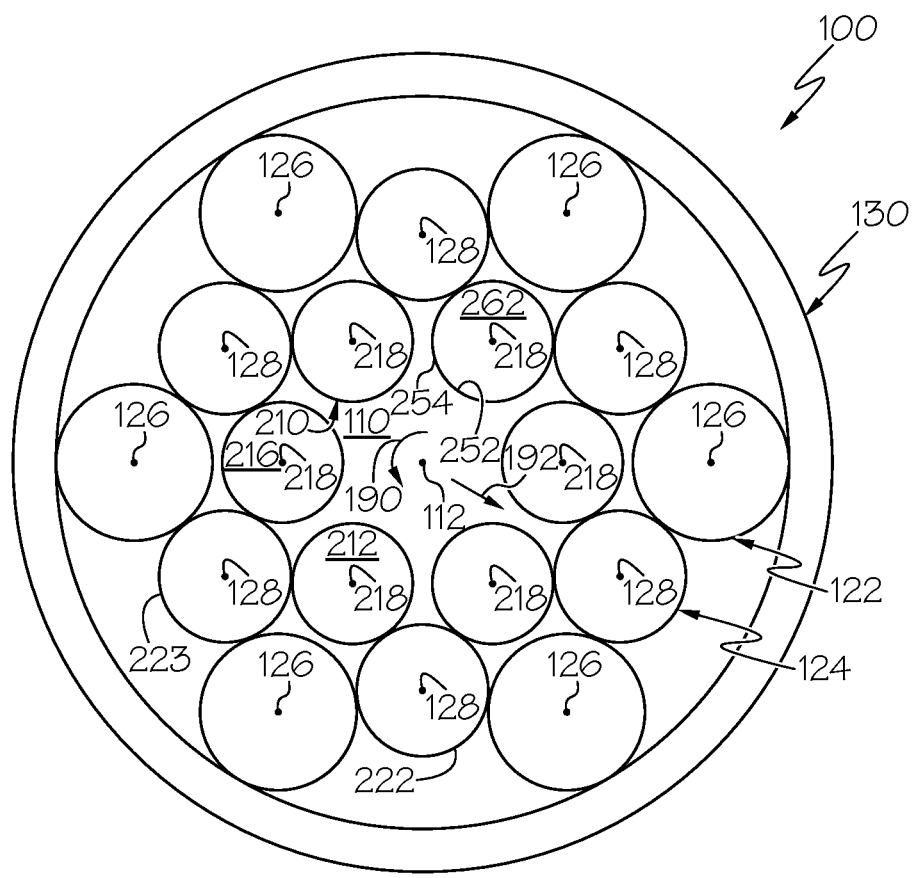
FIG. 2 schematically depicts a cross-sectional view of a hollow-core optical fiber according to one or more embodiments described herein.

Referring now to FIG. 2, in embodiments, the hollow-core optical fiber 100 may further comprise a plurality of third cladding elements 210. The plurality of third cladding elements 210 may be spaced apart from each other and positioned between the plurality of second cladding elements 124 and the hollow core 110. Each of the plurality of third cladding elements 210 may extend in a direction parallel to the central longitudinal axis 112 of the hollow-core optical fiber 100. Each of the third cladding elements may comprise a third capillary. The third capillary comprises an inner surface 252 defining a third cavity 262 having a third diameter. In embodiments, the third cavity 262 is occupied solely by a gas.

In embodiments, the plurality of third cladding elements 210 may comprise from 3 to 8 third capillaries. For example, without limitation, the plurality of third cladding elements 210 may comprise 3, 4, 5, 6, 7, or 8 third capillaries. In embodiments, the plurality of third cladding elements 210 may comprise from 5 to 6 third capillaries. In embodiments, the plurality of first cladding elements 122, the plurality of second cladding elements 124, and the plurality of third cladding elements 210 may comprise the same number of capillaries. For example, according to the embodiment depicted in FIG. 2, the plurality of first cladding elements 122, the plurality of second cladding elements 124, and the plurality of third cladding elements 210 each comprise 6 capillaries.

Each third capillary in the plurality of third cladding elements 210 may be directly connected to at least one second capillary in the plurality of second cladding elements 124. In embodiments, each third capillary in the plurality of third cladding elements 210 may be directly connected to two or a plurality of second capillaries in the plurality of second cladding elements 124. For example, capillary 212 in the plurality of third cladding elements 210 may be directly connected to capillary 223 in the plurality of second cladding elements 124 at point 214 and capillary 212 may be directly connected to capillary 223 in the plurality of second cladding elements 124 at point 215 in the embodiment depicted in FIG. 2. In embodiments, each second capillary may directly contact two third capillaries. Without intending to be bound by theory, direct connection between capillaries in the plurality of third cladding elements 210 with two capillaries in the plurality of second cladding elements 124 may increase the structural integrity of the plurality of third cladding elements 210. This may lead to fewer defects in the plurality of third cladding elements 210 during manufacturing of the hollow-core optical fiber 100.

In embodiments, each third capillary in the plurality of third cladding elements 210 is spaced apart from adjacent capillaries in the plurality of third cladding elements 210 in a circumferential direction 190. Each third capillary in the plurality of third cladding elements 210 may not be in direct contact with another third capillary in the plurality of third cladding elements 210. For example, according to the embodiment depicted in FIG. 2, third capillary 212 and third capillary 216 are both cladding elements in the plurality of third cladding elements 210, and third capillary 212 and third capillary 216 are spaced apart in a circumferential direction 190 such that third capillary 212 and third capillary 216 are not in direct contact with each other. Without intending to be bound by theory, when third capillaries in the plurality of third cladding elements 210 are in direct contact, the points at which the capillaries are in contact may support localized modes, which may permit coupling between core modes and cladding modes that may increase light leakage from the hollow core. Accordingly, direct contact between the capillaries may reduce the confinement of light in the hollow core 110 of the hollow-core optical fiber 100 at those points. In turn, this may result in increased attenuation of an optical signal passing through the hollow-core optical fiber 100.

Each third capillary in the plurality of third cladding elements 210 comprises a third capillary central longitudinal axis 218. Each third capillary central longitudinal axis 218 may be parallel to the central longitudinal axis 112 of the hollow-core optical fiber 100. In embodiments, each third capillary central longitudinal axis 218 may be parallel to each other third capillary central longitudinal axis 218. In embodiments, each third capillary central longitudinal axis 218 may be parallel to each of the first capillary central longitudinal axes 126. In embodiments, each third capillary central longitudinal axis 218 may be parallel to each of the second capillary central longitudinal axes 128. In embodiments, the central longitudinal axis 112 of the hollow-core optical fiber 100 may be parallel to each first capillary central longitudinal axes 126, each second capillary central longitudinal axes 128, and each third capillary central longitudinal axis 218. In embodiments, each third capillary central longitudinal axis 218 may be positioned on a circumference of a circle that is perpendicular to central longitudinal axis 112 of the hollow-core optical fiber 100. For example, in embodiments, each third capillary central longitudinal axis 218 may be positioned on the circumference of a circle that is perpendicular to and centered on the central longitudinal axis 112 of the fiber. In such embodiments, it should be understood that each third capillary central longitudinal axis 218 is equidistant from the central longitudinal axis 112 of the fiber.

In embodiments, each third capillary in the plurality of third cladding elements 210 has an inner diameter from 15 µm to 66 µm. For example, without limitation, each third capillary in the plurality of third cladding elements 210 has an inner diameter from 15 µm to 66 µm, from 20 µm to 66

μm, from 25 μm to 66 μm, from 30 μm to 66 μm, from 35 μm to 66 μm, from 40 μm to 66 μm, from 45 μm to 66 μm, from 50 μm to 66 μm, from 55 μm to 66 μm, from 60 μm to 66 μm, from 15 μm to 60 μm, from 15 μm to 55 μm, from 15 μm to 50 μm, from 15 μm to 45 μm, from 15 μm to 40 μm, from 15 μm to 35 μm, from 15 μm to 30 μm, from 15 μm to 25 μm, from 15 μm to 20 μm, or any combination or subset of these ranges.

In embodiments, each third capillary in the plurality of third cladding elements 210 has a wall thickness from 0.1 μm to 1.5 μm. As described herein, wall thickness refers to the distance between the exterior surface 254 of each third capillary and the inner surface 252 of each third capillary. For example, without limitation, each third capillary in the plurality of third cladding elements 210 may have a wall thickness from 0.1 μm to 1.5 μm, from 0.3 μm to 1.5 μm, from 0.5 μm to 1.5 μm, from 0.7 μm to 1.5 μm, from 0.9 μm to 1.5 μm, from 1.1 μm to 1.5 μm, from 1.3 μm to 1.5 μm, from 0.1 μm to 1.3 μm, from 0.1 μm to 1.1 μm, from 0.1 μm to 0.9 μm, from 0.1 μm to 0.7 μm, from 0.1 μm to 0.5 μm, from 0.1 μm to 0.3 μm, or any combination or sub-set of these ranges. In embodiments, each third capillary may have a wall thickness, such as a wall thickness according to Equation 1, that promotes confinement of the optical signal in the hollow core 110 through an anti-resonant effect. Without intending to be bound by theory, when each third capillary has a wall thickness that provides the anti-resonant effect, attenuation of an optical signal passing through the optical fiber may be reduced.

Figure 3:
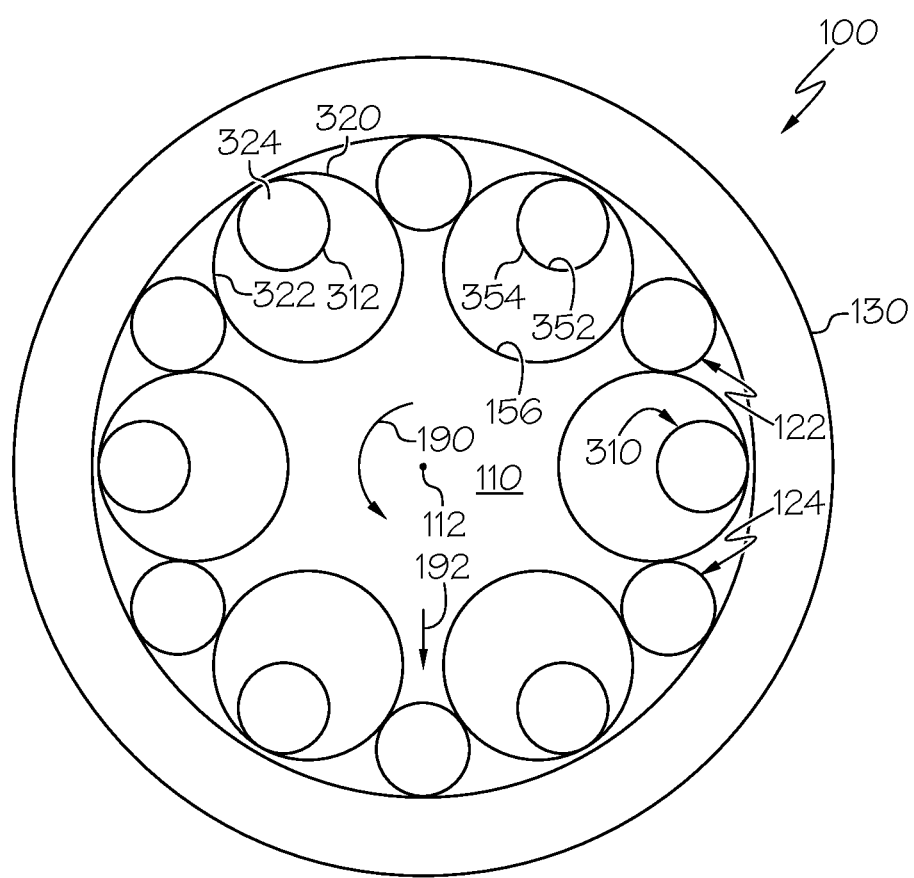
FIG. 3 schematically depicts a cross-sectional view of a hollow-core optical fiber according to one or more embodiments described herein.

In embodiments, each first capillary in the plurality of first cladding elements 122 or each second capillary in the plurality of second cladding elements 124 may comprise a nested capillary 310. As described herein, a "nested capillary" refers to a capillary positioned within another capillary such that an exterior surface of the nested capillary is directly connected to an inner surface of the capillary. According to the embodiment of FIG. 3, an exterior surface 354 of each nested capillary 310 is directly connected to an inner surface 156 of the capillary in which it is positioned. For example, according to the embodiment depicted in FIG. 3, nested capillary 312 is in direct contact with an inner surface 322 of second capillary 320. In embodiments, each first capillary in the plurality of first cladding elements 122 may comprise a nested capillary (not depicted). In embodiments, each second capillary in the plurality of second cladding elements 124 may comprise a nested capillary 310 as depicted in FIG. 3. Note that while a nested capillary may be occupied solely by a gas, a capillary within which a nested capillary is positioned is not. For example, according to the embodiment depicted in FIG. 3, nested capillary 312 is occupied solely by a gas, but second capillary 320 is not since it is necessarily occupied in part by nested capillary 312.

Each nested capillary 310 may directly contact the inner surface of the first capillary or the inner surface of the second capillary at a point proximate to the substrate 130. As described herein, a point on the inner surface of a capillary is proximate to the substrate 130 when it is the closest point to the substrate 130 evaluated in a radial direction 192. For example, according to the embodiment depicted in FIG. 3, nested capillary 312 is directly connected to an inner surface 322 of second capillary 320 at point 324, which is proximate to the substrate 130 because it is the closest point on inner surface 322 of second capillary 320 to the substrate 130 when evaluated in a radial direction 192.

Note in the embodiment depicted in FIG. 3, that capillaries that include a nested capillary are not in direct contact with the inner surface of substrate 130. Instead, a gap is present. For example, second capillary 320 includes nested capillary 312 and second capillary 320 is spaced apart from the inner surface of substrate 130. Without wishing to be bound by theory, it is believed for some embodiments that a gap increases confinement (reduces confinement loss) of optical signals in hollow core 110. In other embodiments, capillaries that include a nested capillary are in direct contact with the inner surface of substrate tube 130.

In embodiments, each nested capillary 310 may have an inner diameter from 6 μm to 25 μm. For example, without limitation, each nested capillary 310 may have an inner diameter from 6 μm to 25 μm, from 9 μm to 25 μm, from 12 μm to 25 μm, from 15 μm to 25 μm, from 18 μm to 25 μm, from 21 μm to 25 μm, from 6 μm to 22 μm, from 6 μm to 19 μm, from 6 μm to 16 μm, from 6 μm to 13 μm, from 6 μm to 10 μm, or any combination or sub-set of these ranges.

In embodiments, each nested capillary 310 may have a wall thickness from 0.1 μm to 1.5 μm. Wall thickness refers to the distance between the exterior surface 354 of the nested capillary 310 and the inner surface 352 of the nested capillary 310. For example, without limitation, each nested capillary 310 may have a wall thickness from 0.1 μm to 1.5 μm, from 0.3 μm to 1.5 μm, from 0.5 μm to 1.5 μm, from 0.7 μm to 1.5 μm, from 0.9 μm to 1.5 μm, from 1.1 μm to 1.5 μm, from 1.3 μm to 1.5 μm, from 0.1 μm to 1.3 μm, from 0.1 μm to 1.1 μm, from 0.1 μm to 0.9 μm, from 0.1 μm to 0.7 μm, from 0.1 μm to 0.5 μm, from 0.1 μm to 0.3 μm, or any combination or sub-set of these ranges. In embodiments, each nested capillary may have a wall thickness, such as a wall thickness according to Equation 1, to provide an anti-resonant effect. Without intending to be bound by theory, when each nested capillary has a wall thickness that provides the anti-resonant effect, attenuation of an optical signal passing through the optical fiber may be reduced.

In embodiments, each of the capillaries may comprise silica-based glass. Silica based glass may include pure silica or silica that is doped with one or more dopants to modify the index of refraction of the silica. Each of the first capillaries in the plurality of first cladding elements 122 may comprise silica-based glass. Each of the second capillaries in the plurality of second cladding elements 124 may comprise silica-based glass. In embodiments, each of the first capillaries, the second capillaries, or both may consist essentially of or consist of silica-based glass. In embodiments, each third capillary in the plurality of third cladding elements 210 may comprise silica-based glass. Each third capillary in the plurality of third cladding elements 210 may consist essentially of or consist of silica-based glass. In embodiments, each nested capillary 310 may comprise silica-based glass. Each nested capillary may consist essentially of or consist of silica-based glass. In embodiments, the substrate 130 may comprise silica-based glass. In embodiments, the substrate 130 may consist essentially of or consist of silica-based glass.

The hollow core 110 may comprise one or more gasses. In embodiments, the hollow core 110 may comprise one or more inert gasses. In embodiments, the hollow core 110 may comprise, consist essentially of, or consist of air.

In the embodiments described herein, the cladding elements may be configured to confine a fundamental mode of an optical signal (i.e., light) propagating in the hollow core 110 of the hollow-core optical fiber 100 to the hollow core 110 by one or more of the anti-resonant effect and an inhibited coupling mechanism. In embodiments, confinement occurs without the effect of a periodic photonic band-gap structure. In embodiments, the fundamental mode of the optical signal may have a wavelength from 350 nm to 8000 nm. For example, without limitation, the fundamental mode of the optical signal may have a wavelength from 350 nm to 8000 nm, from 500 nm to 8000 nm, from 1000 nm to 8000 nm, from 1500 nm to 8000 nm, from 2000 nm to 8000 nm, from 2500 nm to 8000 nm, from 3000 nm to 8000 nm, from 3500 nm to 8000 nm, from 4000 nm to 8000 nm, from 4500 nm to 8000 nm, from 5000 nm to 8000 nm, from 5500 nm to 8000 nm, from 6000 nm to 8000 nm, from 6500 nm to 8000 nm, from 7000 nm to 8000 nm, from 7500 nm to 8000 nm, from 350 nm to 7500 nm, from 350 nm to 7000 nm, from 350 nm to 6500 nm, from 350 nm to 6000 nm, from 350 nm to 5500 nm, from 350 nm to 5000 nm, from 350 nm to 4500 nm, from 350 nm to 4000 nm, from 350 nm to 3500 nm, from 350 nm to 3000 nm, from 350 nm to 2500 nm, from 350 nm to 2000 nm, from 350 nm to 1500 nm, from 350 nm to 1000 nm, from 350 nm to 500 nm, or any combination or subset of these ranges. In embodiments, the plurality of first cladding elements and the plurality of second cladding elements may be configured to provide an anti-resonant effect at a wavelength from 350 nm to 8000 nm, the anti-resonant effect operable to confine an optical signal propagating in the hollow-core optical fiber at the wavelength from 350 nm to 8000 nm to the hollow core 110.

Without intending to be bound by theory, confinement loss may be the dominant attenuation factor in the hollow-core optical fibers described herein. Confinement loss may occur as light leaks from the hollow core 110 to the cladding 130. Confinement loss may be calculated using Equation 2 and Equation 3.

$$n_{eff} = n_r + i \cdot n_{im} \quad \text{Equation 2}$$

$$CL\left[\frac{dB}{km}\right] = \frac{20}{\ln(10)} \cdot \frac{2\pi}{\lambda} \cdot \text{Im}(n_{eff}) \cdot 10^3 \quad \text{Equation 3}$$

In Equations 2 and 3, $n_{eff}$ is the effective index of the mode propagating in the hollow-core fiber with the real part of $n_r$ and the imaginary part of $n_{im}$. The real part of the effective index is related to the propagation speed of the mode and the imaginary part is related to the confinement loss of the mode. For an anti-resonant hollow core fiber with a given structure of the core and the cladding, the effective index may be determined using a fiber modeling tool, such as COMSOL Multiphysics®. The confinement loss is calculated using Equation 3.

In embodiments, the hollow-core optical fiber 100 has a confinement loss that varies with wavelength and the hollow-core optical fiber has a minimum confinement loss of a fundamental mode of an optical signal propagating in the hollow core 110 of less than or equal to 0.50 dB/km within a wavelength range from 350 nm to 8000 nm. For example, without limitation, the hollow-core optical fiber 100 may have a minimum confinement loss of less than or equal to 0.5 dB/km, 0.4 dB/km, 0.3 dB/km, 0.2 dB/km, 0.1 dB/km, or 0.5 dB/km within a wavelength range from 350 nm to 8000 nm, from 500 nm to 8000 nm, from 1000 nm to 8000 nm, from 1500 nm to 8000 nm, from 2000 nm to 8000 nm, from 2500 nm to 8000 nm, from 3000 nm to 8000 nm, from 3500 nm to 8000 nm, from 4000 nm to 8000 nm, from 4500 nm to 8000 nm, from 5000 nm to 8000 nm, from 5500 nm to 8000 nm, from 6000 nm to 8000 nm, from 6500 nm to 8000 nm, from 7000 nm to 8000 nm, from 7500 nm to 8000 nm, from 350 nm to 7500 nm, from 350 nm to 7000 nm, from 350 nm to 6500 nm, from 350 nm to 6000 nm, from 350 nm to 5500 nm, from 350 nm to 5000 nm, from 350 nm to 4500 nm, from 350 nm to 4000 nm, from 350 nm to 3500 nm, from 350 nm to 3000 nm, from 350 nm to 2500 nm, from 350 nm to 2000 nm, from 350 nm to 1500 nm, from 350 nm to 1000 nm, from 350 nm to 500 nm, or any combination or subset of these wavelength ranges.

In embodiments where the hollow-core optical fiber comprises cladding elements comprising nested capillaries, the hollow-core optical fiber may have a confinement loss that varies with wavelength and the hollow-core optical fiber may have a minimum confinement loss of a fundamental mode of an optical signal propagating in the hollow-core optical fiber of less than or equal to 0.2 dB/km within a wavelength range from 350 nm to 8000 nm. For example, without limitation, the hollow-core optical fiber 100 may have a minimum confinement loss of less than or equal to 0.2 dB/km, 0.15 dB/km, 0.1 dB/km, 0.06 dB/km, 0.05 dB/km, 0.04 dB/km, 0.03 dB/km, 0.02 dB/km, or 0.01 dB/km within a wavelength range from 350 nm to 8000 nm, from 500 nm to 8000 nm, from 1000 nm to 8000 nm, from 1500 nm to 8000 nm, from 2000 nm to 8000 nm, from 2500 nm to 8000 nm, from 3000 nm to 8000 nm, from 3500 nm to 8000 nm, from 4000 nm to 8000 nm, from 4500 nm to 8000 nm, from 5000 nm to 8000 nm, from 5500 nm to 8000 nm, from 6000 nm to 8000 nm, from 6500 nm to 8000 nm, from 7000 nm to 8000 nm, from 7500 nm to 8000 nm, from 350 nm to 7500 nm, from 350 nm to 7000 nm, from 350 nm to 6500 nm, from 350 nm to 6000 nm, from 350 nm to 5500 nm, from 350 nm to 5000 nm, from 350 nm to 4500 nm, from 350 nm to 4000 nm, from 350 nm to 3500 nm, from 350 nm to 3000 nm, from 350 nm to 2500 nm, from 350 nm to 2000 nm, from 350 nm to 1500 nm, from 350 nm to 1000 nm, from 350 nm to 500 nm, or any combination or subset of these wavelength ranges.

Embodiments of the hollow-core optical fibers may be made by the following method. The cladding elements, such as the plurality of first cladding elements 122 and the plurality of second cladding elements 124, may be sleeved into a substrate 130 in a desired arrangement. The cladding elements may be joined to the substrate and each other, as desired, to form a preform assembly. The cladding elements and substrate may be joined by any suitable means, such as, but not limited to, fusing, welding, and adhesives. Techniques for welding include laser welding, flame welding, and plasma welding. The preform assembly may be redrawn into a fiber preform using conventional fiber redraw techniques. The fiber preform may then be drawn into optical fiber using conventional fiber drawing techniques.

EXAMPLES

The embodiments described herein will be further clarified by the following examples.

Example 1—Modeling Confinement Loss of a Hollow-Core Optical Fiber

Figure 4:
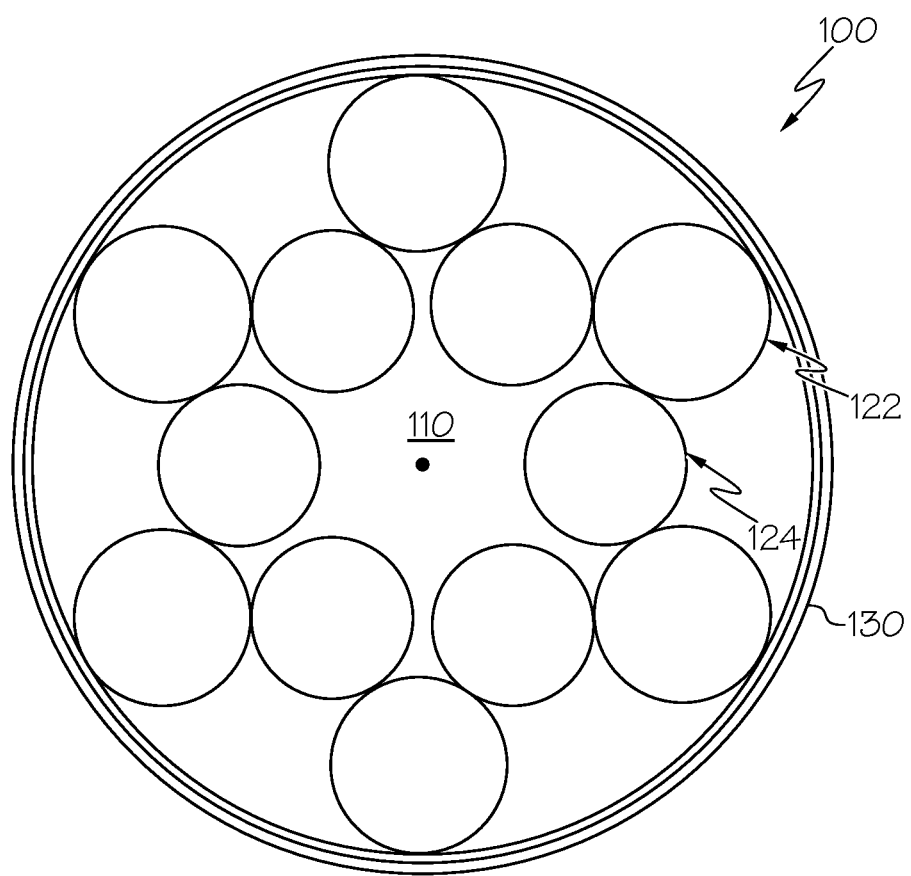
FIG. 4 schematically depicts a cross-sectional view of a hollow-core optical fiber according to the embodiment of Example 1.

A hollow-core optical fiber 100 having a plurality of first cladding elements 122 and a plurality of second cladding elements 124 was modeled to determine the confinement loss of the fiber. A cross-section of the modeled hollow-core optical fiber of Example 1 is depicted in FIG. 4. The plurality of first cladding elements 122 included six capillaries. Each capillary in the plurality of first cladding elements 122 had an inner diameter of 30 μm and a wall thickness of 560 nm. The plurality of first cladding elements 122 was symmetrically disposed about the central longitudinal axis of hollow core 110. The plurality of second cladding elements 124 included six capillaries. Each capillary in the plurality of second cladding elements 124 had an inner diameter of 27 μm and a wall thickness of 560 nm. The plurality of second cladding elements 124 was symmetrically disposed about the central longitudinal axis of hollow core 110. The inner diameter of the substrate 130 was 132 μm, and the wall thickness of the substrate 130 was 2 μm. The diameter of the hollow core 110 was approximately 34.5 μm. The diameter of the hollow-core 100 was defined as the diameter of a circle that contacts each of the plurality of second cladding elements 124 at a point nearest to the central longitudinal axis of hollow core 110. The substrate 130, the plurality of first cladding elements 122 and the plurality of second cladding elements 124 comprised pure silica. As shown in FIG. 4, the structure of the hollow-core optical fiber was symmetric with a 60° rotational symmetry or six repetitions.

The confinement of an optical signal within the hollow core 110 of the hollow-core optical fiber of Example 1 was modeled using COMSOL Multiphysics® modeling software. According to the model, the hollow-core optical fiber of Example 1 effectively confined the optical signal to the hollow-core of the fiber. In particular, the confinement loss of the fiber was 0.46 dB/km for the fundamental mode of an optical signal having a wavelength of 1550 nm.

Figure 5:
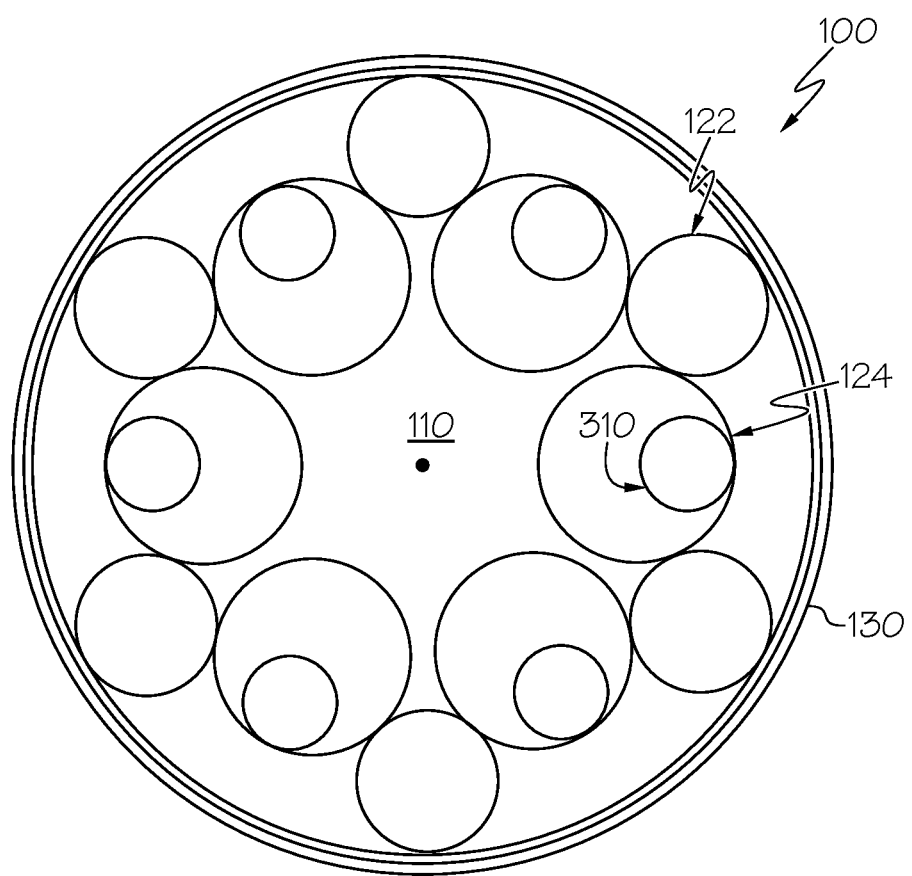
FIG. 5 schematically depicts a cross-sectional view of a hollow-core optical fiber according to the embodiment of Example 2.

Example 2—Modeling Confinement Loss of a Hollow-Core Optical Fiber Comprising Nested Capillaries A hollow-core optical fiber 100 having a plurality of first cladding elements 122 and a plurality of second cladding elements 124 was modeled to determine the confinement loss of the fiber. A cross-section of the modeled hollow-core optical fiber 100 of Example 2 is depicted in FIG. 5. The plurality of first cladding elements 122 included six capillaries. Each capillary in the plurality of first cladding elements had an inner diameter of 20 μm and a thickness of 570 nm. The plurality of first cladding elements 122 was symmetrically disposed about the central longitudinal axis of hollow core 110. The plurality of second cladding elements 124 included six capillaries that each had a nested capillary 310. Each capillary in the plurality of second cladding elements 124 had an inner diameter of 27.5 μm and a thickness of 520 nm. The plurality of second cladding elements 124 was symmetrically disposed about the central longitudinal axis of hollow core 110. Each nested capillary 310 had an inner diameter of 12.8 μm and a thickness of 520 nm. The plurality of nested cladding elements was symmetrically disposed about the central longitudinal axis of hollow core 110. The inner diameter of the substrate 130 was 110 μm, and the wall thickness of the substrate 130 was 2 μm. The diameter of the hollow core 110 was about 34.5 μm. The substrate 130, the plurality of first cladding elements 122 and the plurality of second cladding elements 124 comprised pure silica. As shown in FIG. 5, the structure of the hollow-core optical fiber 100 was symmetric with a 60° rotational symmetry or six repetitions.

The confinement of an optical signal within the hollow-core of the hollow-core optical fiber of Example 2 was modeled using COMSOL Multiphysics® modeling software. According to the model, the hollow-core optical fiber of Example 2 provided excellent confinement of the optical signal to the hollow-core of the fiber. In particular, the confinement loss of the fiber was from 0.035-0.055 dB/km for the fundamental mode of an optical signal having a wavelength of 1550 nm, depending on the polarization of the light.

Figure 6:
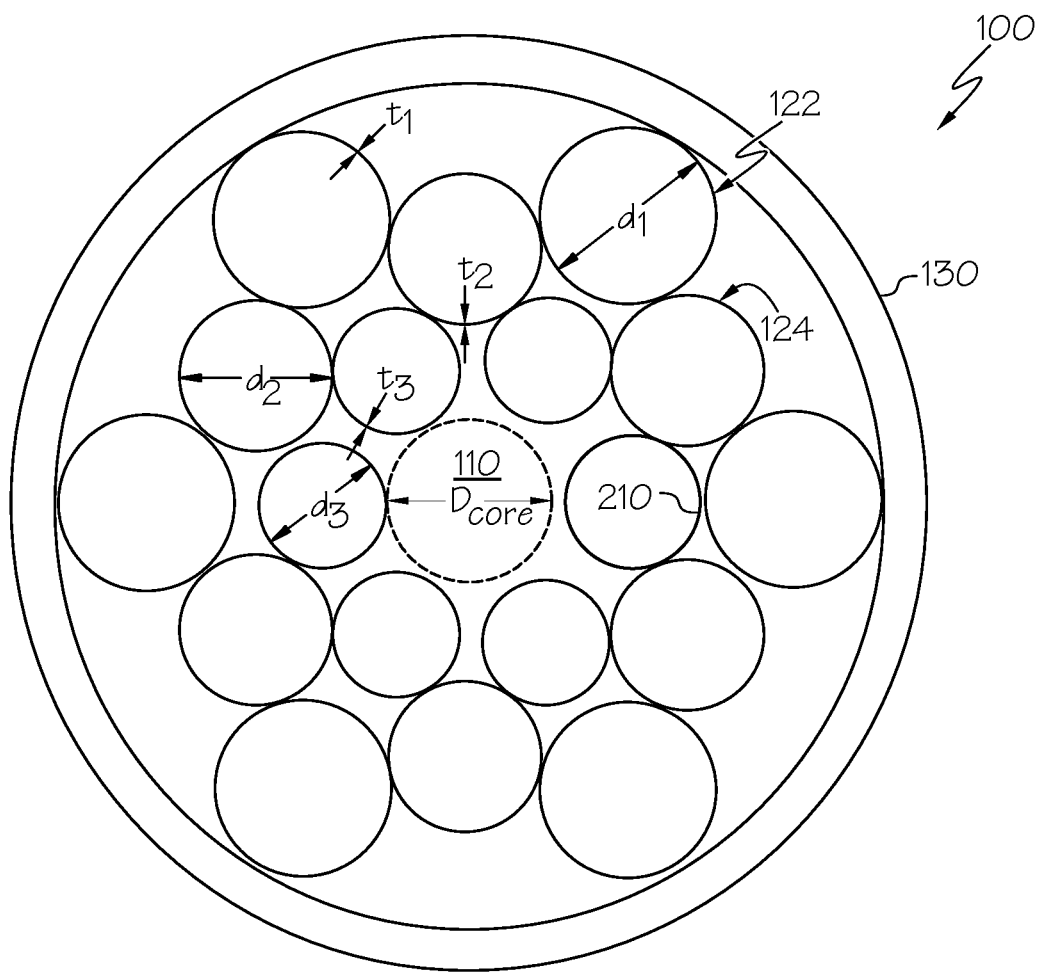
FIG. 6 schematically depicts a cross-sectional view of a hollow-core optical fiber according to the embodiments of Example 3.

Example 3—Modeling Confinement Loss as a Function of Wavelength of a Hollow-Core Optical Fiber One hollow-core optical fiber having a plurality of first cladding elements and a plurality of second cladding elements (Fiber 1) and four hollow-core optical fibers having a plurality of first cladding elements, a plurality of second cladding elements, and a plurality of third cladding elements (Fibers 2-5) were modeled to analyze the confinement loss of the hollow-core optical fiber as a function of wavelength. A general structure of each of the four hollow-core fibers including pluralities of first, second, and third cladding elements (Fibers 2-5 in Table 1) is depicted in FIG. 6. A general structure of Fiber 1 is depicted in FIG. 4. In each of these fibers, the plurality of first cladding elements 122 had six capillaries, the plurality of second cladding elements 124 had six capillaries and the plurality of third cladding elements 210 had six capillaries. Each of pluralities 122, 124, and 210 was symmetrically disposed about the central longitudinal axis of hollow core 110. The cladding elements and substrates of Fibers 1-5 comprised pure silica. The dimensions of each of the five optical fibers are included in Table 1.

TABLE 1

Hollow-Core Optical Fiber Dimensions.

| | $D_{Core}$ (μm) | $d_1$ (μm) | $t_1$ (nm) | $d_2$ (μm) | $t_2$ (nm) | $d_3$ (μm) | $t_3$ (nm) |
|---|---|---|---|---|---|---|---|
| Fiber 1 | 34.5 | 30 | 560 | 27.5 | 560 | NA | NA |
| Fiber 2 | 34.5 | 33 | 560 | 32 | 560 | 27.5 | 560 |
| Fiber 3 | 34.5 | 33 | 580 | 32 | 580 | 27.5 | 580 |
| Fiber 4 | 34.5 | 33 | 600 | 32 | 600 | 27.5 | 600 |
| Fiber 5 | 34.5 | 33 | 620 | 32 | 620 | 27.5 | 620 |

Figure 7:
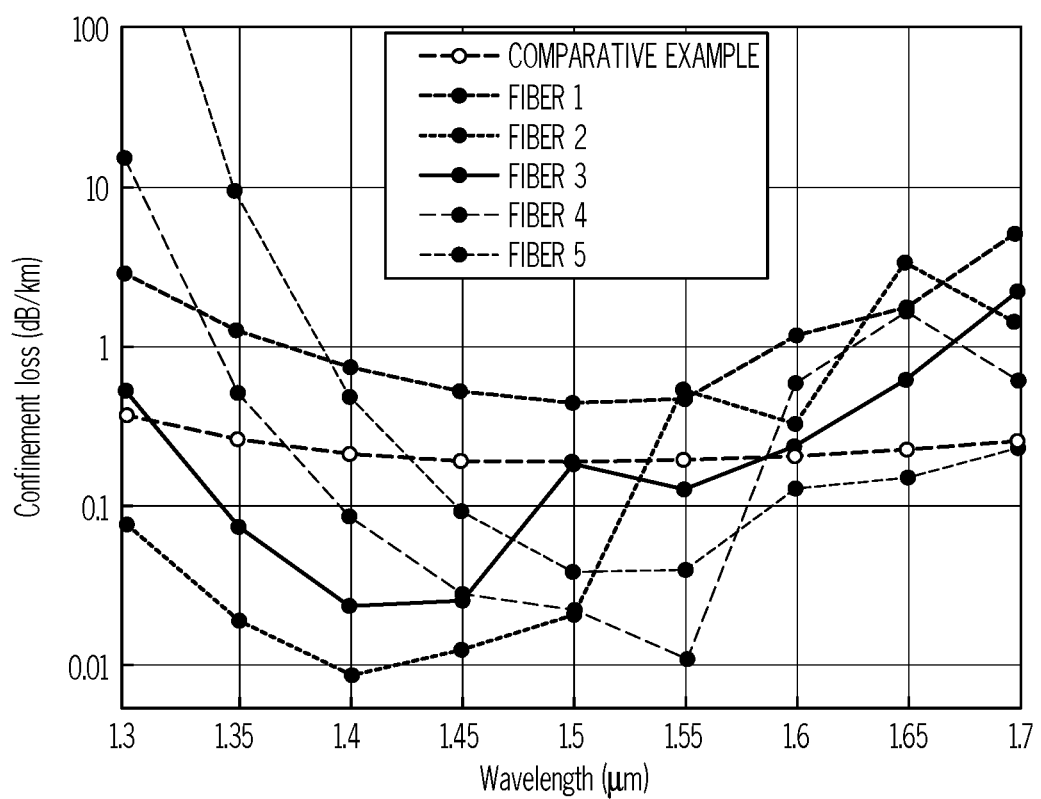
FIG. 7 graphically depicts confinement loss of the hollow-core optical fiber of Example 3 as a function of wavelength.
Figure 8:
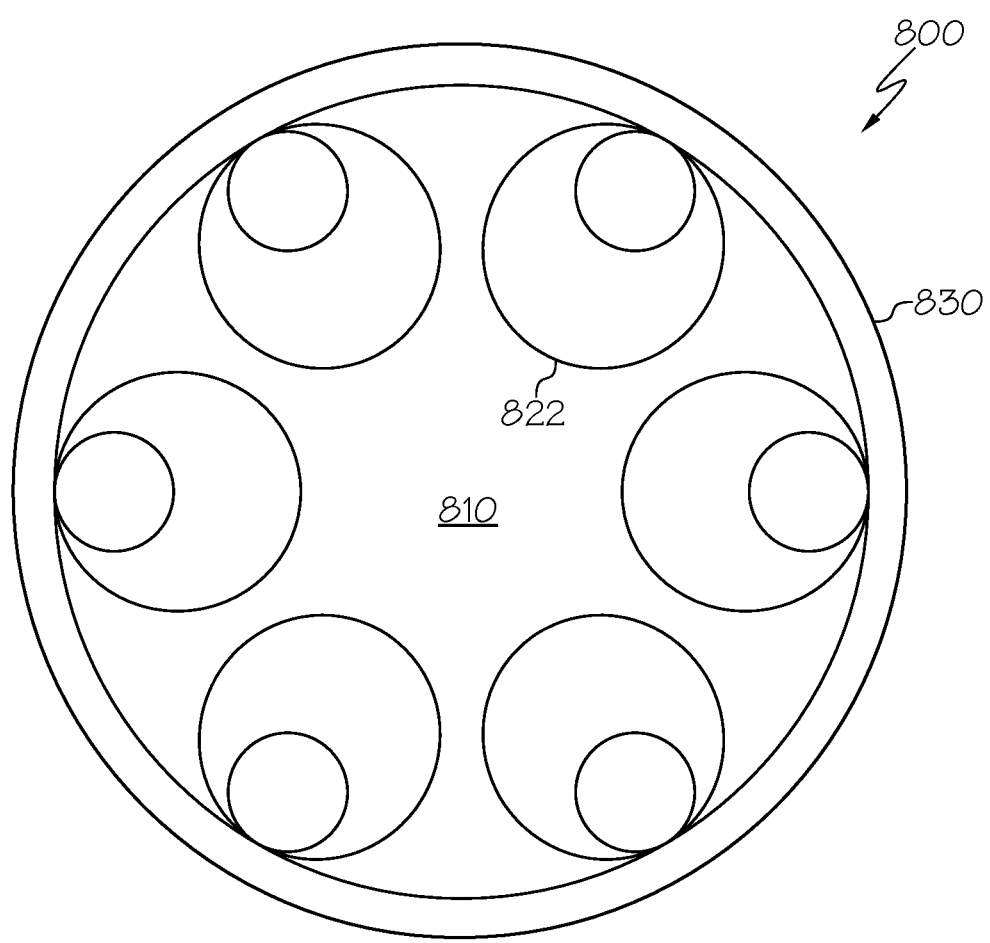
FIG. 8 schematically depicts a cross-sectional view of the hollow-core optical fiber of a comparative example.

The confinement loss of each fiber was calculated over wavelengths from 1300 nm to 1700 nm. The results are shown in FIG. 7. Additionally, FIG. 7 includes the confinement loss as a function of wavelength of a comparative hollow-core optical fiber 800 depicted in FIG. 8. The comparative hollow-core optical fiber 800 included six capillaries 822 with a single nested capillary 850 positioned in each capillary 822. The single nested capillary 850 was attached to the capillary 822 at a point proximate to the substrate 830. Each capillary 822 had a diameter of 27.5 μm and a thickness of 0.5 μm, and each nested capillary 850 had a diameter of 13 μm and a thickness of 0.53 μm. The hollow-core 810 had a diameter of about 34.5 μm. The substrate 830 had an inner diameter of about 165 μm and a wall thickness of 2 μm. The substrate 830, capillaries 822, and nested capillaries 850 comprised pure silica. As shown in FIG. 8, the structure of the comparative hollow-core optical fiber 800 is symmetric with a 60° rotational symmetry or six repetitions. Referring again to FIG. 7, FIG. 7 demonstrates that the confinement loss of the hollow-core optical fiber, including the wavelength at which the minimum confinement loss occurs, may be tuned by adjusting the thickness of the capillaries and by adjusting the number of pluralities of cladding elements.

The present disclosure is directed to various embodiments of hollow-core optical fibers. In embodiments, hollow-core optical fiber comprises a hollow-core extending along a central longitudinal axis of the fiber; a substrate; a plurality of first cladding elements spaced apart from each other and positioned between the hollow-core and the substrate; and a plurality of second cladding elements spaced apart from each other and positioned between the hollow-core and the plurality of first cladding elements. The hollow-core optical fibers may be operable to transmit optical signals, and the cladding elements may reduce attenuation of the optical signals through one or more of an anti-resonant effect and a negative curvature effect.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

The invention claimed is:

1. A hollow-core optical fiber comprising:
a hollow core extending along a central longitudinal axis of the hollow-core optical fiber;
a substrate, the substrate comprising a tubular shape and an inner surface surrounding the central longitudinal axis of the hollow-core optical fiber;
a plurality of first cladding elements spaced apart from one another and positioned between the hollow core and the substrate, each of the plurality of first cladding elements extending in a direction parallel to the central longitudinal axis of the hollow-core optical fiber, each of the plurality of first cladding elements comprising a first capillary, the first capillary comprising an inner surface defining a first cavity, the first cavity having a first diameter and being occupied solely by a gas; and
a plurality of second cladding elements spaced apart from one another and positioned between the hollow core and the substrate, each of the second cladding elements extending in a direction parallel to the central longitudinal axis of the hollow-core optical fiber, each of the second cladding elements comprising a second capillary, the second capillary comprising an inner surface defining a second cavity, the second cavity having a second diameter and being occupied solely by the gas, the second diameter differing from the first diameter, wherein:
each of the plurality of first cladding elements directly contacts the inner surface of the substrate;
none of the second cladding elements directly contacts the inner surface of the substrate;
each first cladding element is spaced apart from adjacent first cladding elements in a circumferential direction by one of the second cladding elements in an alternating manner, and
the second diameter is greater than the first diameter.

2. The hollow-core optical fiber of claim 1, wherein each second capillary directly contacts at least one first capillary.

3. The hollow-core optical fiber of claim 1, wherein each second cladding element is spaced apart from the inner surface of the substrate in a radial direction.

4. The hollow-core optical fiber of claim 1, wherein each second cladding element is spaced apart from adjacent second cladding elements in a circumferential direction.

5. The hollow-core optical fiber of claim 1, wherein each first capillary is directly connected to two second capillaries.

6. The hollow-core optical fiber of claim 1, wherein:
each first capillary comprises a first capillary central longitudinal axis parallel to the central longitudinal axis of the hollow-core optical fiber and the first capillary central longitudinal axis is a first radial distance from the central longitudinal axis;
each second capillary comprises a second capillary central longitudinal axis parallel to the central longitudinal axis of the hollow-core optical fiber and the second capillary central longitudinal axis is a second radial distance from the central longitudinal axis; and
the first radial distance is greater than the second radial distance.

7. The hollow-core optical fiber of claim 1, wherein each first capillary has an inner diameter from 12 µm to 54 µm.

8. The hollow-core optical fiber of claim 1, wherein each first capillary has a wall thickness from 0.1 µm to 4.0 µm.

9. The hollow-core optical fiber of claim 1, wherein each second capillary has an inner diameter from 16 µm to 65 µm.

10. The hollow-core optical fiber of claim 1, wherein each second capillary has a wall thickness from 0.1 µm to 4.0 µm.

11. The hollow-core optical fiber of claim 1, wherein the plurality of first cladding elements and the plurality of second cladding elements are configured to provide an anti-resonant effect operable to confine an optical signal having a wavelength from 350 nm to 8000 nm in the hollow core.

12. The hollow-core optical fiber of claim 1, wherein the hollow-core optical fiber has a confinement loss that varies with wavelength and the hollow-core optical fiber has a minimum confinement loss of a fundamental mode of an optical signal propagating in the hollow-core optical fiber less than or equal to 0.50 dB/km within a wavelength range from 350 nm to 8000 nm.

13. A hollow-core optical fiber, comprising:
a hollow core extending along a central longitudinal axis of the hollow-core optical fiber;
a substrate, the substrate comprising a tubular shape and an inner surface surrounding the central longitudinal axis of the hollow-core optical fiber;
a plurality of first cladding elements spaced apart from one another and positioned between the hollow core and the substrate, each of the plurality of first cladding elements extending in a direction parallel to the central longitudinal axis of the hollow-core optical fiber, each of the plurality of first cladding elements comprising a first capillary, the first capillary comprising an inner surface defining a first cavity, the first cavity having a first diameter and being occupied solely by a gas; and
a plurality of second cladding elements spaced apart from one another and positioned between the hollow core and the substrate, each of the second cladding elements extending in a direction parallel to the central longitudinal axis of the hollow-core optical fiber, each of the second cladding elements comprising a second capillary, the second capillary comprising an inner surface defining a second cavity, the second cavity having a second diameter and being occupied solely by the gas, the second diameter differing from the first diameter; and
a plurality of third cladding elements spaced apart from one another and positioned between the plurality of second cladding elements and the hollow core, each of the plurality of third cladding elements extending in a direction parallel to the central longitudinal axis of the hollow-core optical fiber, wherein each of the plurality of third cladding elements comprises a third capillary, the third capillary comprising an inner surface defining a third cavity having a third diameter and being occupied solely by the gas, wherein:
each of the plurality of first cladding elements directly contacts the inner surface of the substrate;
none of the second cladding elements directly contacts the inner surface of the substrate; and
each first cladding element is spaced apart from adjacent first cladding elements in a circumferential direction by one of the second cladding elements in an alternating manner, and
the second diameter is greater than the first diameter; and
each third cladding element is spaced apart from adjacent third cladding elements in a circumferential direction by one of the second cladding elements in an alternating matter; and
none of the third cladding elements directly contacts the inner surface of the substrate.

14. The hollow-core optical fiber of claim 13, wherein the third diameter differs from the first diameter and the second diameter.

15. A hollow-core optical fiber comprising:
a hollow core extending along a central longitudinal axis of the hollow-core optical fiber;
a substrate, the substrate comprising a tubular shape and an inner surface surrounding the central longitudinal axis of the hollow-core optical fiber;
a plurality of first cladding elements spaced apart from one another and positioned between the hollow core and the substrate, each of the plurality of first cladding elements extending in a direction parallel to the central longitudinal axis of the hollow-core optical fiber, each of the plurality of first cladding elements comprising a first capillary, the first capillary comprising an inner surface defining a first cavity, the first cavity having a first diameter, wherein each of the plurality of first cladding elements directly contacts the inner surface of the substrate; and
a plurality of second cladding elements spaced apart from one another and positioned between the hollow core and the substrate, each of the second cladding elements extending in a direction parallel to the central longitudinal axis of the hollow-core optical fiber, each of the second cladding elements comprising a second capillary, the second capillary comprising an inner surface defining a second cavity, the second cavity having a second diameter, the second diameter differing from the first diameter, wherein none of the second cladding elements directly contacts the inner surface of the substrate; and
wherein each second capillary comprises a nested capillary, each nested capillary directly contacting the inner surface of the second capillary; and
wherein each first cladding element is spaced apart from adjacent first cladding elements in a circumferential direction by one of the second cladding elements in an alternating manner, and
wherein the second diameter is greater than the first diameter.

16. The hollow-core optical fiber of claim 15, wherein each nested capillary has an inner diameter from 6 μm to 25 μm.

17. The hollow-core optical fiber of claim 15, wherein each nested capillary has a wall thickness from 0.1 μm to 4.0 μm.

* * * * *